(12) United States Patent
Lohrentz

(10) Patent No.: US 8,752,360 B2
(45) Date of Patent: Jun. 17, 2014

(54) VARIABLE LENGTH HEADER TRUSS FOR HARVESTING HEADER

(71) Applicant: AGCO Corporation, Duluth, GA (US)

(72) Inventor: Randy Lohrentz, Buhler, KS (US)

(73) Assignee: AGCO Corporation, Duluth, GA (US)

( * ) Notice: Subject to any disclaimer, the term of this patent is extended or adjusted under 35 U.S.C. 154(b) by 0 days.

(21) Appl. No.: 13/727,916

(22) Filed: Dec. 27, 2012

(65) Prior Publication Data

US 2013/0291511 A1  Nov. 7, 2013

Related U.S. Application Data

(60) Provisional application No. 61/580,771, filed on Dec. 28, 2011.

(51) Int. Cl.
*A01D 67/00* (2006.01)
*A01D 45/02* (2006.01)
*A01D 41/16* (2006.01)

(52) U.S. Cl.
CPC .............. *A01D 67/00* (2013.01); *A01D 45/021* (2013.01); *A01D 41/16* (2013.01)
USPC ........................................................ 56/208

(58) Field of Classification Search
CPC ....... A01B 45/04; A01D 41/14; A01D 67/00; A01D 43/082; A01D 45/021; A01C 5/06
USPC ......... 56/208, 15.8, 119, 153, 228, 364, 14.9, 56/218, DIG. 10; 172/5, 6
See application file for complete search history.

(56) References Cited

U.S. PATENT DOCUMENTS

| | | | | |
|---|---|---|---|---|
| 3,574,990 A | * | 4/1971 | Calder | 56/208 |
| 3,589,115 A | * | 6/1971 | Taylor et al. | 56/208 |
| 4,266,392 A | * | 5/1981 | Knepper et al. | 56/14.5 |
| 4,409,780 A | * | 10/1983 | Beougher et al. | 56/228 |
| 4,632,192 A | * | 12/1986 | Hooks | 172/19 |
| 4,809,471 A | * | 3/1989 | Wichman et al. | 52/109 |
| 5,107,663 A | * | 4/1992 | Wattron et al. | 56/15.7 |
| 6,029,429 A | * | 2/2000 | Fox et al. | 56/10.2 E |
| 6,272,823 B1 | * | 8/2001 | Yeomans | 56/158 |
| 6,675,568 B2 | * | 1/2004 | Patterson et al. | 56/208 |
| 7,918,076 B2 | * | 4/2011 | Talbot | 56/208 |
| 8,028,506 B1 | * | 10/2011 | Casper et al. | 56/14.2 |
| 8,061,114 B2 | * | 11/2011 | Mossman et al. | 56/51 |
| 2003/0074876 A1 | * | 4/2003 | Patterson et al. | 56/257 |
| 2005/0120694 A1 | * | 6/2005 | Calmer | 56/14.7 |
| 2007/0163220 A1 | * | 7/2007 | Ehrhart et al. | 56/10.2 E |
| 2007/0186532 A1 | * | 8/2007 | Mossman et al. | 56/119 |
| 2008/0072560 A1 | * | 3/2008 | Talbot | 56/208 |

* cited by examiner

*Primary Examiner* — Arpád Fábián-Kovács

(57) ABSTRACT

A harvesting header frame has a top beam, a bottom beam, and a diagonal truss member. A first end of said diagonal truss member is structurally connected to the top beam and an opposing second end of said diagonal truss member is structurally connected to the bottom beam. The header frame also has a diagonal truss length adjustment mechanism that adjusts the length of the diagonal truss member to selectively lengthen or shorten the effective length of the diagonal truss member to modify the concavity of the header frame after the top and bottom beams and diagonal truss member have been connected. In one embodiment, the diagonal truss length adjustment mechanism is a telescoping compression member.

14 Claims, 4 Drawing Sheets

VARIABLE LENGTH HEADER TRUSS FOR HARVESTING HEADER

CROSS REFERENCE TO RELATED APPLICATIONS

This application claims priority to U.S. Provisional Application No. 61/580,771 filed Dec. 28, 2011, entitled "VARIABLE LENGTH HEADER TRUSS FOR HARVESTING HEADER".

BACKGROUND OF THE INVENTION

1. Field of Invention

This invention relates to a harvesting header for a combine harvester, and more particularly, to a header frame having a diagonal truss member with a length adjustment mechanism used to change the amount of bow in the header frame.

2. Description of Related Art

Agricultural harvesters such as combines are typically equipped with a harvesting header. For example, corn headers are specifically designed to pick corn and vary in size from two-row units to twelve-row units or more. As the harvester moves through the field, each row-unit passes between rows of corn. Corn header row units typically use gathering chains to covey crop material and ears rearward toward a cross auger. A set of driven snap rolls, which rotate based on the speed of the harvester, grabs the corn stalks and forces them downward between stripper plates. The ears of corn are snapped free of the stalk and the cross auger passes the ears to the feeder housing of the harvester. If the snap rolls are operated too fast or too slow, ears of corn may be lost or entire corn stalks may be passed to the cross auger and feeder housing.

Over the years, the width of harvesting headers has increased in order to reducing the number of passes through the field required by the harvesting machine to cover the entire field. However, as the width of headers increases, the amount of flexing of the structure of the header which occurs has also increased. This has resulted in increased difficulties in maintaining the header in a straight orientation for proper operation. Headers are typically supported by the harvesting machine at a location in the middle of the header. When the header is suspended above the ground, the ends of the header tend to deflect downward under the load. As headers increase in width, it is harder to prevent this deflection.

Header manufacturers have taken various approaches to address this problem. One approach is to build a header frame with an inner section having a pair of central inner support beams spaced outwardly from a midpoint of the header and a pair of outer sections having at least one outer pair of support beams which are arranged at or adjacent the outer ends of the inner section. A number of braces and gussets connect to the beams to form a truss like structure to reduce the deflection. The individual pieces are welded together with the intent that the header will resist deflection under load. However, stresses can concentrate at the interfaces between the sections leading to frame failure or requiring additional reinforcement.

In order to accommodate this downward flexing of the outer ends of the header, in initial manufacture, the support beams of the header are welded such that, in an unstressed condition, the header is upwardly concave, that is the middle portion of the header is lower than the outer end of the header. When the header is fully assembled onto the harvesting combine, the weight of the header tends to flex the frame so as to reduce the concave shape. However, the weight and positioning of header components during assembly can vary so it is not always possible to properly calculate the required concave shape. Additionally, over time, the frame may continue to settle into an upwardly convex shape in which the ends are lower than the center.

OVERVIEW OF THE INVENTION

In one embodiment, the invention is directed a harvesting header for use with a crop harvesting machine. The harvesting header has a header frame with a top beam, a bottom beam, and a diagonal truss member. A first end of said diagonal truss member is structurally connected to the top beam and an opposing second end of said diagonal truss member is structurally connected to the bottom beam. The header frame also has a diagonal truss length adjustment mechanism that adjusts the length of the diagonal truss member to selectively lengthen or shorten the effective length of the diagonal truss member to modify the concavity of the header frame after the top and bottom beams and diagonal truss member have been connected. In one embodiment, the diagonal truss length adjustment mechanism comprises a telescoping compression member. The header frame also has an end panel connected to an end of the top beam and a vertical main structure connecting the top and bottom beams at interior portions of the top and bottom beams. The diagonal truss member is connected to the top beam at a junction with the end panel and the diagonal truss member is connected to the bottom beam at a junction with the vertical main structure. The telescoping compression member is a threaded adjustment bolt passing through a first eye mounted on the diagonal truss member and a second eye mounted on a header mounting plate connected at the junction of the top beam and the end panel. The threaded adjustment bolt is threaded at both ends and adjustment nuts are received on both sides of the first and second eyes such that the effective length of the diagonal truss member is adjusted by adjusting the position of the adjustment nuts on the threaded adjustment bolt.

These and other features and advantages of this invention are described in, or are apparent from, the following detailed description of various exemplary embodiments of the systems and methods according to this invention.

BRIEF DESCRIPTION OF THE DRAWINGS

The above mentioned and other features of this invention will become more apparent and the invention itself will be better understood by reference to the following description of embodiments of the invention taken in conjunction with the accompanying drawings, wherein.

Corresponding reference characters indicate corresponding parts throughout the views of the drawings.

DESCRIPTION OF EXAMPLE EMBODIMENTS

The present invention is susceptible of embodiment in many different forms. While the drawings illustrate and the specification describes certain preferred embodiments of the invention, it is to be understood that such disclosure is by way of example only. There is no intent to limit the principles of the present invention to the particular disclosed embodiments. References hereinafter made to certain directions, such as, for example, "front", "rear", "left" and "right", are made as viewed from the side of the combine.

Figure 1:
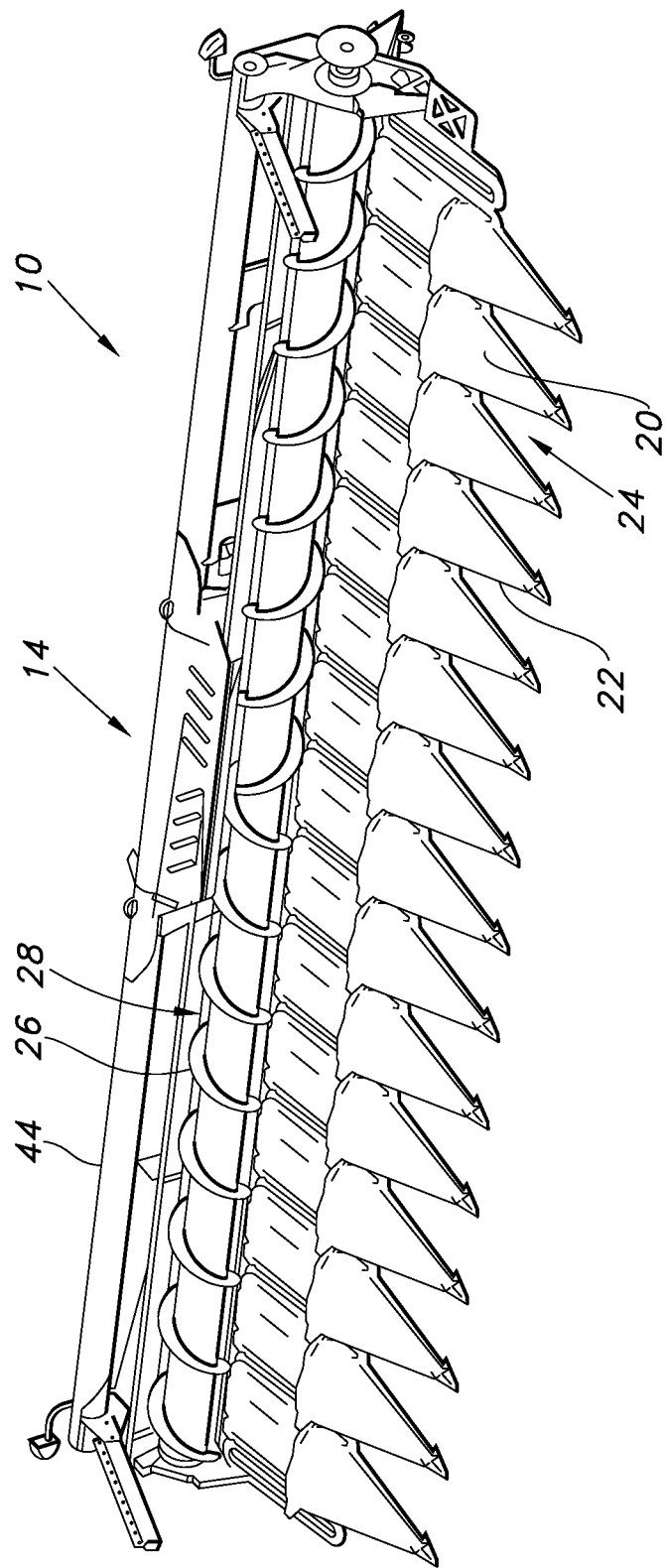
FIG. 1 is a perspective view of a harvester header for use with a harvesting machine.

Referring now to the drawings, and particularly to FIG. 1, a harvesting header for use with an agricultural combine harvester (not shown) is seen generally at 10. As is known in the art, the harvesting header 10 is mounted in a cantilevered manner on a feederhouse 12 (FIG. 2) of the combine harvester at a center area 14 of the harvesting header 10. The illustrated harvesting header 10 shown herein is a corn header designed to harvest multiple rows of corn simultaneously. However, one skilled in the art will understand that harvesting headers 10 for use in harvesting other crops may utilize concepts described herein without departing from the scope of the invention.

Row units 20 that may be of conventional construction are arranged in side-by-side relationship on the harvesting header 10. Although sixteen row units 20 are shown here, the harvesting header 10 may have any number of such units, in side-by-side relationship, across its width. Each row unit 20 is desirably constructed and operated in a substantially identical manner through any known means. The row units 20 may have a removable snout or divider 22 hingedly coupled to the front of each of the row units 20. As is known in the art, corn stalks are drawn into slots 24 formed by the row units 20, such as with gathering chains (not shown). Snapping rolls (not shown) pull the corn stalks downwardly through the slot 24 and the ears of corn are stripped off of the stalks as the stalks are pulled downwardly between them. Ears of corn are stripped from each of the stalks and carried by an auger 26 in a trough 28 toward the feederhouse interface 12. The collected ears are then carried rearwardly and upwardly into a threshing assembly (not shown) of the combine harvester as known in the art.

Figure 2:
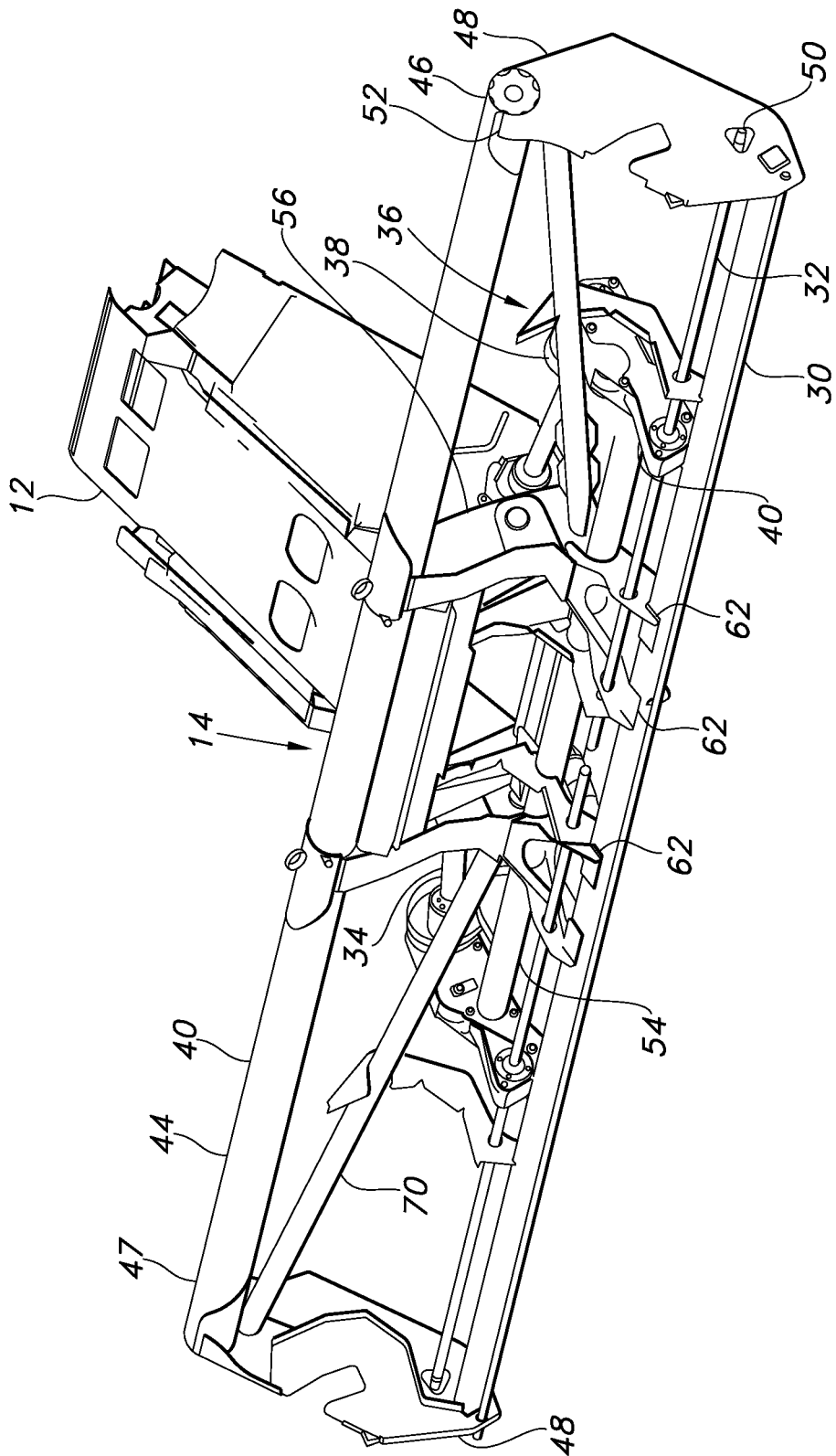
FIG. 2 is a front perspective view of a portion of the harvesting header of FIG. 1 with parts broken away to reveal internal details of the header frame.
Figure 3:
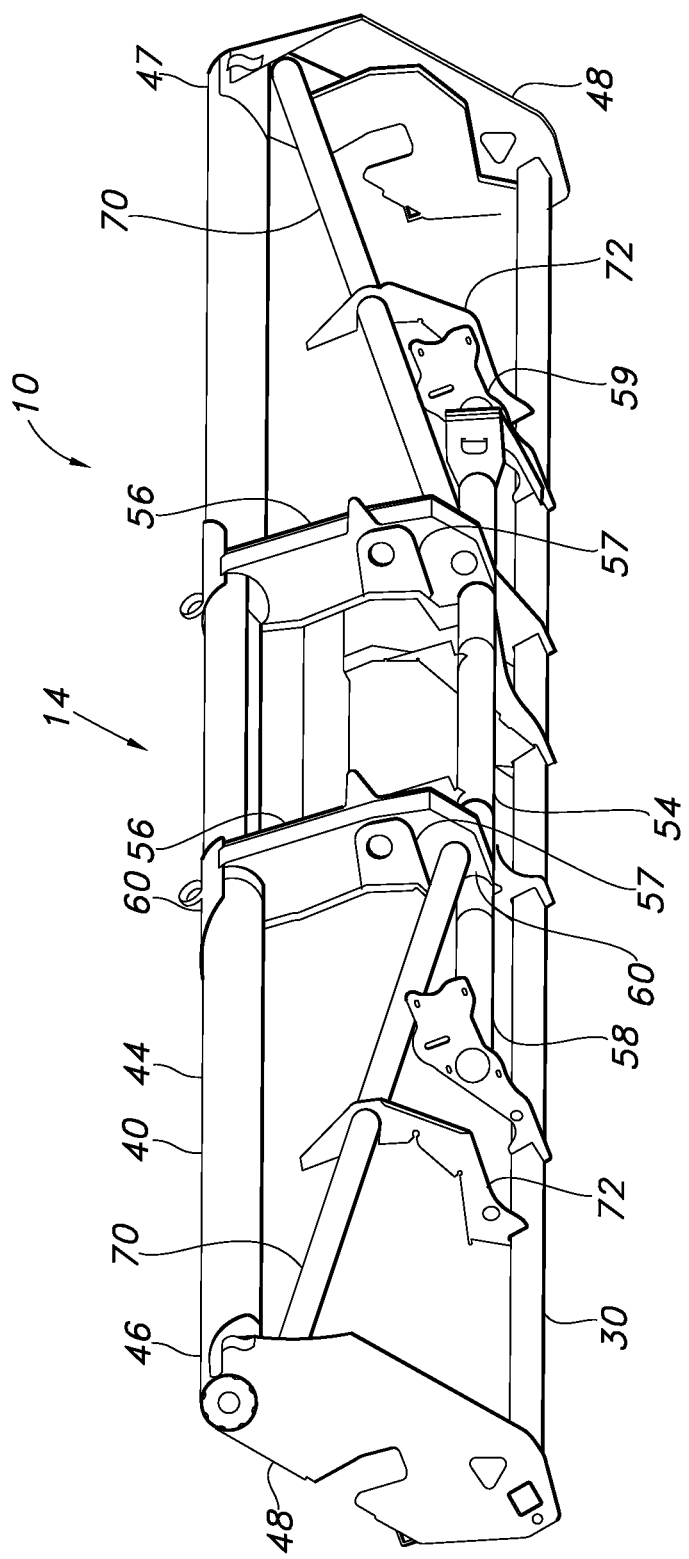
FIG. 3 is a rear perspective view of a portion of the harvesting header of FIG. 1 with parts broken away to reveal internal details of the header frame.

Turning to FIG. 2, the row units 20 are mounted on a tool bar 30 that extends transversely across the width of the header 10. The gathering chains and snapping rolls are driven by a rotating row unit shaft 32 which extends transversely of the units over the width of the harvesting header 10. The row unit shaft 32 is drivingly connected to each row unit 20 through any known gear box assembly (not shown). The row unit shaft 32 is driven by a power take-off (PTO) shaft 34 through a header drive system 36. In one embodiment, the header drive system 36 includes a pair of substantially identical drive assemblies 38. Each drive assembly 38 includes a cog belt (not shown) housed in a belt case 40 to transfer power from PTO shafts 34 extending from opposing sides of the feederhouse interface 12 to the row unit shaft 32. However, one skilled in the art will understand that the header drive system 36 may utilize any other chain or gearbox assembly without departing from the scope of the invention.

The harvesting header 10 has a header frame 42 with a top beam 44 which extends across an upper-rear portion of the harvesting header 10. The top beam 44 has ends 46 and 47 arranged at opposite ends of the harvesting header 10 such that the top beam 44 extends substantially the full width of the harvesting header 10. The top beam 44 provides the main structural support for the header frame 42 and desirably is a round tube that provides suitable resistance to torque. The header frame 42 further includes end panels 48 attached to the ends 46 and 47 of the top beam 44. Desirably, the top beam 44 is welded to gussets 52 on the end panels 48 using sound engineering judgment. The end panels 48 provide support for the tool bar 30 which extends parallel to and spaced forwardly of the top beam 44. End panels 48 also provide rotational support for the row unit shaft 32 with bearings 50.

The header frame 42 also has a bottom beam 54 extending across a portion of the width of the header that is generally parallel to and below the top beam 44. Desirably, the bottom beam 54 also is a round tube that provides suitable resistance to torque. The bottom beam 54 has a midpoint generally in the center area 14 of the harvesting header 10 but does not extend the full width of the harvesting header 10. Vertical main structures 56 connect the top beam 44 and the bottom beam 54. The vertical main structures 56 form an interface with the feederhouse 12. Desirably, the header 10 pivotally connects to the feederhouse 12 of the harvesting combine with mounts 57 on the vertical main structures 56.

Desirably, one vertical main structure 56 is attached to the bottom beam 54 a distance away from the midpoint of the bottom beam 54 toward a first end 58 of the bottom beam 54, and the second vertical main structure 56 is attached to the bottom beam 54 a substantially equal distance from the midpoint but toward an opposing end 59 of the bottom beam 54. Desirably, the bottom beam 54 has a width that is between about 25 percent to about 75 percent of the width of the harvesting header 10. In one embodiment, ends 58, 59 of the bottom beam 54 extend past the vertical main structures 56 and header drive assemblies 38 are arranged at opposite ends 58 of the bottom beam 54. Likewise, the first vertical main structure 54 is attached to the top beam 44 a distance away from the midpoint of the top beam 44 toward the end 46 of the top beam 44, and the second vertical main structure 56 is attached to the top beam 44 the same distance from the midpoint of the top beam 44 but toward the opposing end 47 of the top beam 44. Suitable gusset plates 60 are used in welding the vertical main structures 56 to the top beam 44 and bottom beam 54. Connecting plates 62 extend from the vertical main structures 56 and support the tool bar 30.

Diagonal truss members 70 connect the top beam 44 and the bottom beam 54. In the illustrated embodiment, diagonal truss members 70 connect the outer ends 46. 47 of the top beam 44 with the bottom beam 54. In one embodiment, outer ends of the diagonal truss members 70 are structurally connected to respective ends of the top beam 44, and inner ends of the diagonal truss members 70 are structurally connected adjacent respective interfaces of the bottom beam 54 and the vertical main structures 56. By "structurally connected", it is meant that the diagonal truss members 70 are joined either directly or indirectly with suitable gusset plates using sound engineering judgment. Desirably, the components are welded together using suitable gusset plates. The header frame 42 further comprises two inner support plates 72, each of which is attached to a diagonal truss member 70 so as to be supported thereby. Each of the inner support plates 72 supports the tool bar 30.

Figure 4:
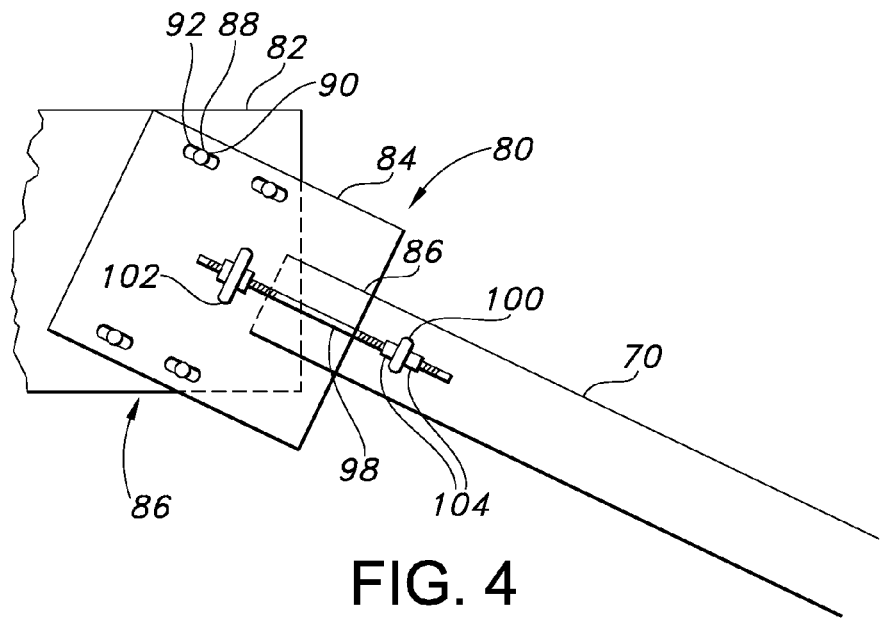
FIG. 4 is a side view of a length adjustment mechanism of a diagonal truss member of the header frame of FIG. 2.
Figure 5:
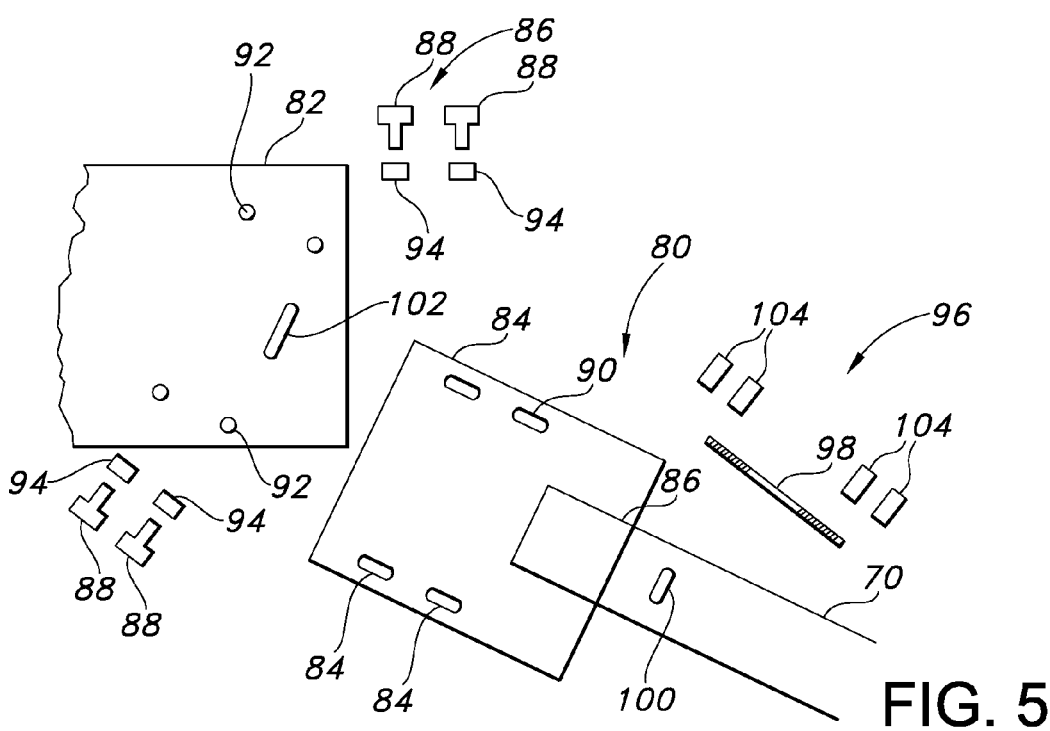
FIG. 5 is an exploded view of the length adjustment mechanism of FIG. 4.

In one embodiment, each diagonal truss member 70 has a length adjustment mechanism 80 that permits the length of the diagonal truss member 70 to be selectively lengthened or shortened after the header frame 42 is fully assembled. The length adjustment mechanism 80 permits the length of the diagonal truss member 70 to be adjusted to correct any bow in the header frame 42 and straighten the harvesting header 10. Turning now to FIGS. 4 and 5, in one embodiment the length adjustment mechanism 80 includes an end panel mounting plate 82 connected to the end panel 48 and a truss mounting plate 84 connected to an outer end 86 of the diagonal truss member 70. The mounting plate 82 and 84 may be connected to the header frame 42 through any known means, such as by welding. The end panel mounting plate 82 and the truss mounting plate 84 are selectively clamped together to discourage relative movement there between using suitable clamping means 86. In one embodiment, the clamping means 86 includes at least one clamping bolt 88 passing through a slotted opening 90 in one of the mounting plates 82, 84 and a circular opening 92 in the other of the mounting plates 84, 82 such that the position of the mounting plates relative to each other can be selected before being clamped together. In the example embodiment, the slotted opening 90 is in the truss mounting plate 84 and the circular opening 92 is in the end panel mounting plate 82. The clamping bolt 88 receives a suitable nut 94 or other retaining device to apply the clamping force to the mounting plates 82, 84. Desirably, a plurality of clamping bolts 88 and a plurality of bolt receiving openings 90, 92 are used. For example, in the illustrated embodiment four clamping bolts 88 are used with four sets of openings 90, 92. However, one skilled in the art will understand that other clamping means 86 may be used to selectively clamp the mounting plates 82, 84 together to prevent relative movement of the truss mounting plate 84 with respect to the end panel mounting plate 82.

In one embodiment, the length adjustment mechanism 82 includes a telescoping compression member 96 connecting the end of the diagonal truss member 70 and the end panel mounting plate 82. In the illustrated embodiment, the telescoping compression member 96 is a threaded adjustment bolt 98 passing through a first eye 100 connected to the truss member 70 and a second eye 102 connected to the header mounting plate 82. Desirably, the threaded adjustment bolt 98 is threaded at both ends and adjustment nuts 104 are received on the bolt 98 on both sides of the first and second eyes 100, 102. With the telescoping compression member 96, the effective length of the diagonal truss member 70 can be adjusted to select the amount of tension or compression in the diagonal truss member 70 by adjusting the position of the adjustment nuts 104 on the threaded adjustment bolt 98.

In one method of adjusting the length of the diagonal truss member 70, the clamping nut 94 is loosened to permit relative movement of the mounting plates 82, 84 and then the adjustment nuts 104 are positioned on the threaded adjustment bolt 98 to adjust the effective length of the diagonal truss member 70. Once the desired convex shape in the header 10 is obtained with the length adjustment mechanism 80, the clamping nut 94 is tightened to clamp the mounting plates 82, 84 together. While the length adjustment mechanism 80 in the illustrated embodiment has been shown on the outer end 86 of the diagonal truss member 70, one skilled in the art will understand that the length adjustment mechanism 80 may be placed on the inner end of the diagonal truss member 70 without departing from the scope of the invention. Additionally, one skilled in the art will understand that other forms of telescoping compression members 96 may be used using sound engineering judgment without departing from the scope of the invention.

The foregoing has broadly outlined some of the more pertinent aspects and features of the present invention. These should be construed to be merely illustrative of some of the more prominent features and applications of the invention. Other beneficial results can be obtained by applying the disclosed information in a different manner or by modifying the disclosed embodiments. Accordingly, other aspects and a more comprehensive understanding of the invention may be obtained by referring to the detailed description of the exemplary embodiments taken in conjunction with the accompanying drawings, in addition to the scope of the invention defined by the claims.

What is claimed is:

1. A harvesting header for use with a crop harvesting machine, the harvesting header having a header frame comprising:
   a top beam;
   a bottom beam;
   a diagonal truss member, wherein a first end of said diagonal truss member is structurally connected to the top beam and an opposing second end of said diagonal truss member is structurally connected to the bottom beam; and
   a diagonal truss length adjustment mechanism that adjusts the length of the diagonal truss member to selectively lengthen or shorten the effective length of the diagonal truss member to modify the concavity of the header frame after the top and bottom beams and diagonal truss member have been connected.

2. The harvesting header of claim 1 wherein the diagonal truss length adjustment mechanism comprises a telescoping compression member.

3. The harvesting header of claim 2 further comprising an end panel connected to an end of the top beam and a vertical main structure connecting the top and bottom beams at interior portions of the top and bottom beams, wherein the diagonal truss member is connected to the top beam at a junction with the end panel and the diagonal truss member is connected to the bottom beam at a junction with the vertical main structure.

4. The harvesting header of claim 2 wherein the telescoping compression member is a threaded adjustment bolt passing through a first eye mounted on the diagonal truss member and a second eye mounted on a header mounting plate connected at the junction of the top beam and the end panel.

5. The harvesting header of claim 4 wherein the threaded adjustment bolt is threaded at both ends and adjustment nuts are received on both sides of the first and second eyes such that the effective length of the diagonal truss member is adjusted by adjusting the position of the adjustment nuts on the threaded adjustment bolt.

6. The harvesting header of claim 1 comprising first and second diagonal truss members, wherein first ends of said first and second diagonal truss members are structurally connected to the top beam and opposing second ends of said first and second diagonal truss members are structurally connected to the bottom beam, and first and second diagonal truss length adjustment mechanisms, wherein the first length adjustment mechanism selectively adjusts the length of the first diagonal truss member and the second length adjustment mechanism selectively adjusts the length of the second diagonal truss member to selectively lengthened or shortened the effective length of the first and second diagonal truss members after the top and bottom beams and diagonal truss members are assembled to adjust the concave shape of the header frame.

7. The harvesting header of claim 6 wherein each of the first and second diagonal truss length adjustment mechanisms comprises a telescoping compression member.

8. The harvesting header of claim 7 further comprising first and second end panels connected to ends of the top beam and first and second vertical main structures connecting the top and bottom beams at interior portions of the top and bottom beams.

9. The harvesting header of claim 8 wherein the length adjustment mechanism includes an end panel mounting plate connected to the end panel such as by welding and a truss mounting plate connected to an outer end of the diagonal truss member.

10. The harvesting header of claim 9 wherein the end panel mounting plate and the truss mounting plate are clamped together.

11. The harvesting header of claim 10 wherein the end panel mounting plate and the truss mounting plate are clamped together using a clamping bolt and a nut, wherein the clamping bolt passes through a slotted opening in one of the mounting plates and a circular opening in the other of the mounting plates.

12. The harvesting header of claim 9 wherein the telescoping compression member is a threaded adjustment bolt passing through a first eye connected to the truss member and a second eye connected to the header mounting plate.

13. The harvesting header of claim 12 wherein the threaded adjustment bolt is threaded at both ends and adjustment nuts are received on both sides of the first and second eyes such that the effective length of the diagonal truss member is adjusted by adjusting the position of the adjustment nuts on the threaded adjustment bolt.

14. The harvesting header of claim 2 wherein the top beam extends across substantially a full width of the harvesting header and has ends arranged adjacent respective ends of the harvesting header and a midpoint in a center area of the harvesting header and the bottom beam is substantially parallel to the top beam and extends less than the full width of the harvesting header and has a midpoint in the center area of the harvesting header, wherein the diagonal truss member operatively connects to the bottom beam on one side of the midpoint of the bottom beam and extends outward towards an outer end of the top beam.

* * * * *